United States Patent
Wu

(10) Patent No.: US 10,035,428 B2
(45) Date of Patent: *Jul. 31, 2018

(54) BATTERY CONFIGURATION FOR AN ELECTRIC VEHICLE

(71) Applicant: GOGORO INC., Hong Kong (CN)

(72) Inventor: Yi-Tsung Wu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 205 days.

This patent is subject to a terminal disclaimer.

(21) Appl. No.: 15/139,713

(22) Filed: Apr. 27, 2016

(65) Prior Publication Data

US 2016/0236588 A1    Aug. 18, 2016

Related U.S. Application Data

(63) Continuation of application No. 14/057,405, filed on Oct. 18, 2013, now Pat. No. 9,381,826.

(60) Provisional application No. 61/716,388, filed on Oct. 19, 2012.

(51) Int. Cl.
  *B60L 15/20* (2006.01)
  *B60L 11/18* (2006.01)
  *B60L 11/00* (2006.01)

(52) U.S. Cl.
  CPC ......... *B60L 11/1868* (2013.01); *B60L 11/005* (2013.01); *B60L 11/1803* (2013.01);
  (Continued)

(58) Field of Classification Search
  CPC ............................. B60L 11/005; B60L 15/20
  (Continued)

(56) References Cited

U.S. PATENT DOCUMENTS 6,326,765 B1    12/2001    Hughes et al.
7,148,637 B2 *  12/2006    Shu .................... B60L 11/1822
                                                    307/18
(Continued)

FOREIGN PATENT DOCUMENTS

CA    2 865 976 A1    9/2013
JP    2006-121874 A   5/2006
(Continued)

OTHER PUBLICATIONS

Chen et al., "Adjusting Electric Vehicle Systems Based on an Electrical Energy Storage Device Thermal Profile," U.S. Appl. No. 61/862,854, filed Aug. 6, 2013, 74 pages.

(Continued)

*Primary Examiner* — Kawing Chan
(74) *Attorney, Agent, or Firm* — Perkins Coie LLP

(57) ABSTRACT

A power delivery system for an electric vehicle provides efficient power management for either continuous or intermittent high-performance operation, using a boost stage and an on-board charging circuit. A main battery, configured as a high-capacity power source, supplies power to the electric motor under normal load conditions. An auxiliary boost battery assists the main battery in supplying a high-level current at a higher discharge rate thereby causing the motor to operate in a high-performance drive mode. A charging circuit recharges the boost battery from the main battery during operation of the motor. The charging circuit also maintains a charge balance between the boost battery and the main battery when the two batteries have different chemistries. In one embodiment, participation of the boost battery in powering the electric motor can be controlled automatically according to sensed changes in the load. In another embodiment, power management can be based on timed intervals.

20 Claims, 9 Drawing Sheets

(52) U.S. Cl.
CPC ....... *B60L 11/1822* (2013.01); *B60L 11/1861* (2013.01); *B60L 11/1866* (2013.01); *B60L 15/20* (2013.01); *B60L 15/2009* (2013.01); *B60L 2200/12* (2013.01); *B60L 2200/22* (2013.01); *B60L 2200/36* (2013.01); *B60L 2200/40* (2013.01); *B60L 2210/12* (2013.01); *B60L 2210/14* (2013.01); *B60L 2240/12* (2013.01); *B60L 2240/421* (2013.01); *B60L 2240/423* (2013.01); *B60L 2240/425* (2013.01); *B60L 2240/545* (2013.01); *B60L 2240/547* (2013.01); *B60L 2240/549* (2013.01); *B60L 2250/10* (2013.01); *Y02T 10/645* (2013.01); *Y02T 10/7005* (2013.01); *Y02T 10/7011* (2013.01); *Y02T 10/7022* (2013.01); *Y02T 10/7044* (2013.01); *Y02T 10/7066* (2013.01); *Y02T 10/7225* (2013.01); *Y02T 10/7233* (2013.01); *Y02T 10/7275* (2013.01)

(58) Field of Classification Search
USPC ........................................................ 318/139
See application file for complete search history.

(56) References Cited

U.S. PATENT DOCUMENTS

| | | | |
|---|---|---|---|
| 7,486,034 | B2 | 2/2009 | Nakamura et al. |
| 8,143,849 | B2 | 3/2012 | Miglioranza |
| 8,240,425 | B2 | 8/2012 | Nagase |
| 8,368,346 | B2 | 2/2013 | Batson et al. |
| 8,620,506 | B2 | 12/2013 | Kummer et al. |
| 2008/0111508 | A1 | 5/2008 | Dasgupta et al. |
| 2009/0317696 | A1* | 12/2009 | Chang ............... H01M 10/052 429/61 |
| 2010/0114800 | A1 | 5/2010 | Yasuda et al. |
| 2010/0141213 | A1 | 6/2010 | Iida |
| 2010/0264857 | A1 | 10/2010 | Nagase |
| 2011/0000736 | A1 | 1/2011 | Oya |
| 2012/0091930 | A1 | 4/2012 | Takahashi et al. |
| 2012/0133310 | A1 | 5/2012 | Lee |
| 2012/0133314 | A1 | 5/2012 | Kozarekar et al. |
| 2012/0248869 | A1 | 10/2012 | Itagaki et al. |
| 2012/0321914 | A1 | 12/2012 | Ventura Forés et al. |
| 2013/0026971 | A1 | 1/2013 | Luke et al. |
| 2013/0026973 | A1 | 1/2013 | Luke et al. |
| 2013/0030580 | A1 | 1/2013 | Luke et al. |
| 2013/0030608 | A1 | 1/2013 | Taylor et al. |
| 2013/0030920 | A1 | 1/2013 | Wu et al. |
| 2013/0031318 | A1 | 1/2013 | Chen et al. |
| 2013/0076148 | A1 | 3/2013 | Sa |
| 2013/0264975 | A1 | 10/2013 | Kaita et al. |
| 2014/0217935 | A1 | 8/2014 | Matsui et al. |
| 2014/0368032 | A1 | 12/2014 | Doerndorfer |

FOREIGN PATENT DOCUMENTS

| | | |
|---|---|---|
| JP | 2012-151916 A | 8/2012 |
| KR | 20120020554 A | 3/2012 |
| WO | 2012/085992 A1 | 6/2012 |
| WO | 2013/128007 A2 | 9/2013 |
| WO | 2013/128009 A2 | 9/2013 |
| WO | 2013/128009 A3 | 9/2013 |

OTHER PUBLICATIONS

Chen et al., "Apparatus, System, and Method for Authentication of Vehicular Components," U.S. Appl. No. 13/918,703, filed Jun. 14, 2013, 84 pages.

Chen et al., "Apparatus, Method and Article for Providing Vehicle Diagnostic Data," U.S. Appl. No. 61/601,404, filed Feb. 21, 2012, 56 pages.

Chen et al., "Systems and Methods for Powering Electric Vehicles Using a Single or Multiple Power Cells," U.S. Appl. No. 61/862,852, filed Aug. 6, 2013, 46 pages.

International Search Report and Written Opinion for corresponding International Application No. PCT/US2013/065704, dated Feb. 13, 2014, 13 pages.

Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.

Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.

Luke et al., "Modular System for Collection and Distribution of Electric Storage Devices," U.S. Appl. No. 61/789,065, filed Mar. 15, 2013, 76 pages.

Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.

Luke et al., "Apparatus, Method and Article for Authentication, Security and Control of Power Storage Devices, Such as Batteries," U.S. Appl. No. 61/534,761, filed Sep. 14, 2011, 55 pages.

Luke et al., "Apparatus, Method and Article for Collection, Charging and Distributing Power Storage Devices, Such as Batteries," U.S. Appl. No. 61/511,900, filed Jul. 26, 2011, 73 pages.

Luke et al., "Apparatus, Method and Article for Collection, Charging and Distributing Power Storage Devices, Such as Batteries," U.S. Appl. No. 61/647,936, filed May 16, 2012, 76 pages.

Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.

Luke et al., "Dynamically Limiting Vehicle Operation for Best Effort Economy," U.S. Appl. No. 61/511,880, filed Jul. 26, 2011, 52 pages.

Luke et al., "Thermal Management of Components in Electric Motor Drive Vehicles," U.S. Appl. No. 61/511,887, filed Jul. 26, 2011, 44 pages.

Luke et al., "Thermal Management of Components in Electric Motor Drive Vehicles," U.S. Appl. No. 61/647,941, filed May 16, 2012, 47 pages.

Luke, "Apparatus, Method and Article for Changing Portable Electrical Power Storage Device Exchange Plans," U.S. Appl. No. 61/778,038, filed Mar. 12, 2013, 56 pages.

Luke, "Apparatus, Method and Article for Providing Information Regarding a Vehicle Via a Mobile Device," U.S. Appl. No. 61/780,781, filed Mar. 13, 2013, 80 pages.

Taylor et al., "Apparatus, Method and Article for Physical Security of Power Storage Devices in Vehicles," U.S. Appl. No. 61/557,170, filed Nov. 8, 2011, 60 pages.

Wu et al., "Battery Configuration for an Electric Vehicle," U.S. Appl. No. 61/716,388, filed Oct. 19, 2012, 37 pages.

Wu et al., "Apparatus, Method and Article for a Power Storage Device Compartment," U.S. Appl. No. 61/581,566, filed Dec. 29, 2011, 61 pages.

Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.

Wu et al., "Apparatus, Method and Article for Providing Locations of Power Storage Device Collection, Charging and Distribution Machines," U.S. Appl. No. 61/601,949, filed Feb. 22, 2012, 56 pages.

\* cited by examiner

BATTERY CONFIGURATION FOR AN ELECTRIC VEHICLE

BACKGROUND

Technical Field

The subject matter described herein generally relates to vehicles that employ electric motors and, in particular, multiple-battery configurations used to supply power to such vehicles.

Description of the Related Art

It is generally agreed that reducing toxic emissions on a global scale will require alternatives to gasoline-powered and diesel-powered internal combustion engines currently used in vehicles, especially in automobiles and trucks. The need for emission reduction becomes greater as more people throughout the world acquire engine-powered vehicles, and as pollution levels in emerging commercial centers become increasingly unmanageable.

One viable solution is to encourage the use of electric personal transport vehicles, including automobiles, motorcycles, golf carts, scooters, and the like, where they are feasible. It is especially advantageous to promote the use of "clean energy" vehicles having zero tail pipe emission in the most densely populated metropolitan areas of Asia, for example, cities in China, Taiwan, Korea, and India. In the past, these areas have relied successfully on the use of bicycles for personal transport, but have in recent years replaced bicycles with combustion engine-powered vehicles. Substituting electric vehicles is a way to reduce tail pipe emissions to zero while also lowering overall pollution, because sources of electricity for recharging electric vehicles also tend to be clean energy sources. For example, electrical power may be generated from renewable sources (e.g., solar, hydro), or it may be generated at generation plants that produce no air pollution (e.g., nuclear plants). Also for example, electricity may be generated at plants that burn relatively clean burning fuels (e.g., natural gas), which have higher efficiency than internal combustion engines, and/or which employ pollution control or removal systems (e.g., industrial air scrubbers) which are too large, costly or expensive to install on board individual vehicles.

One barrier to adoption of electric motors for vehicles is that electric motors tend to be under-powered compared to their gasoline engine counterparts. Consequences of engine power constraints for electric vehicles in particular include limiting their range before charging is necessary, and hampering their usefulness in hilly areas or in off-road conditions. Thus, to achieve a high market penetration of electric vehicles worldwide in the more remote areas, and in areas with more challenging terrain, technological advances are needed to improve the efficiency of power delivery for electric vehicles.

BRIEF SUMMARY

A power delivery system for an electric vehicle provides a long driving range and efficient power management for either continuous or intermittent high-performance operation, using an auxiliary boost stage and an on-board charging circuit. A main battery, configured as a high-capacity power source of intermediate-level current, supplies power to the electric motor under normal load conditions. The main battery can be augmented with an auxiliary boost battery that is configured to supply, when needed, a high-level current at a higher discharge rate than the discharge rate of the main battery, thereby causing the motor to operate in a high-performance drive mode. The main battery can be removable for external charging, while the boost battery can be charged from the main battery, during operation of the motor, via a charging circuit that includes a low-cost DC/DC converter. Once the boost battery is charged, the main battery and the boost battery can operate together to power the vehicle at a high power discharge rate. The charging circuit provides a charge-balancing function that allows the main battery and the boost battery to cooperate even if they have different chemistries. If a light-weight battery such as a Lithium-ferrite battery is used for the boost battery, the power delivery system can be particularly advantageous for personal transport vehicles such as scooters or motorbikes. In one embodiment, a request for participation of the boost battery in powering the electric motor can be made automatically according to sensed changes in the load. In another embodiment, power management can be based on timed intervals.

Figure 1:
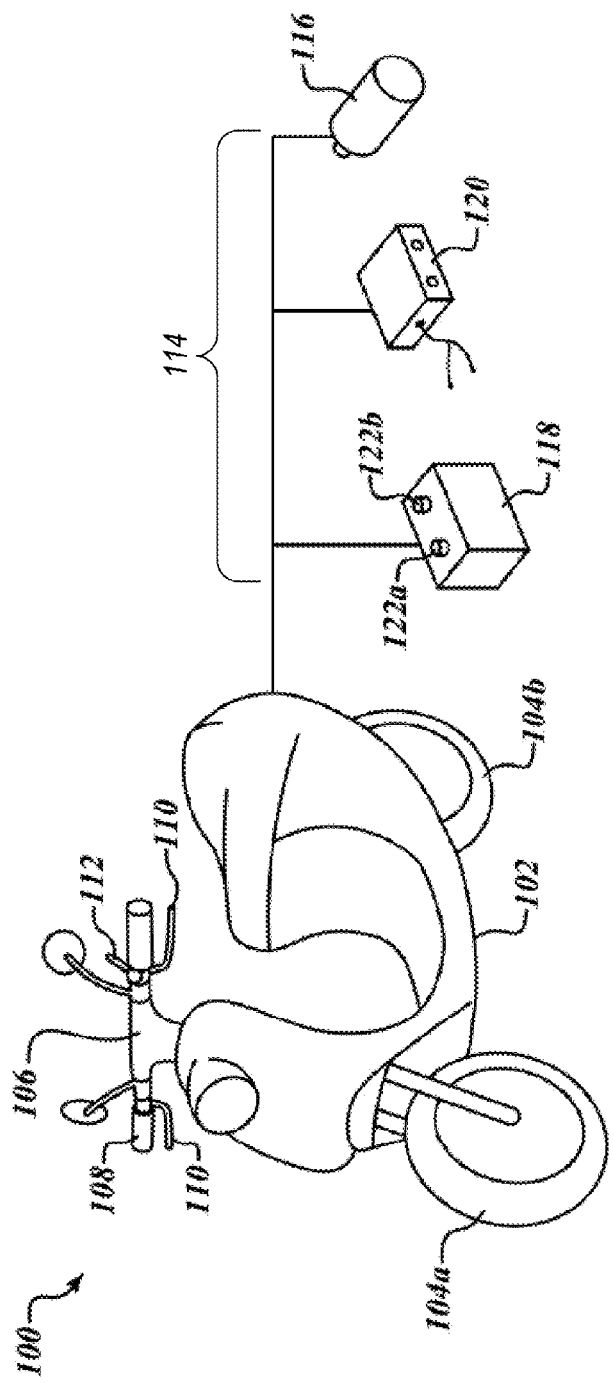
FIG. 1 is an isometric, partially exploded view of an electric vehicle which may include the various components or structures described herein, according to one non-limiting illustrated embodiment.

In the drawings, identical reference numbers identify similar elements. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and they have been solely selected for ease of recognition in the drawings.

DETAILED DESCRIPTION

It will be appreciated that, although specific embodiments of the present disclosure are described herein for purposes of illustration, various modifications may be made without departing from the spirit and scope of the present disclosure. Accordingly, the present disclosure is not limited except as by the appended claims.

In the following description, certain specific details are set forth in order to provide a thorough understanding of various aspects of the disclosed subject matter. However, the disclosed subject matter may be practiced without these specific details. In some instances, well-known structures and methods of power delivery comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Reference throughout the specification to an electric vehicle includes automobiles, scooters, motorbikes, motorcycles, golf carts, lawn mowers, vans, trucks, and the like. The term vehicle should not be construed narrowly to limit a vehicle solely to a personal transport vehicle such as a scooter or motorbike, but rather, the term vehicle is broadly construed to cover many possible types of electrically-powered motorized transportation.

Specific embodiments are described herein with reference to different power management scenarios; however, the present disclosure and the reference to methods of power management should not be limited to those examples which are described herein.

As previously noted, combustion engine scooters and motorbikes are common in many large cities, for example in Asia, Europe and the Middle East. The ability to address performance or efficiency issues related to the use of electrical power storage devices (e.g., secondary or tertiary batteries) as the main or primary source of power for a vehicle may foster the use of all-electric scooters and motorbikes in place of internal combustion engine scooters and motorbikes, thereby alleviating air pollution, as well as reducing noise.

With reference to FIG. 1, an exemplary electric vehicle 100 shown as a scooter or motorbike includes a frame 102, wheels 104a, 104b (collectively 104), and a handle bar 106 with user controls such as a throttle 108, brake levers 110, turn indicators 112, etc., all of which may be of conventional design. The electric vehicle 100 may also include a power system 114, which includes a traction electric motor 116 coupled to drive at least one of the wheels (e.g., the rear wheel 104b), one or more electrical energy storage device(s) 118 that store electrical power to power at least the traction electric motor 116, and a control circuit 120 which controls power distribution between at least the main electrical energy storage device(s) 118 and the traction electric motor 116.

The traction electric motor 116 may take any of a variety of forms, but typically will be a permanent magnet induction motor capable of producing sufficient power (Watts or horsepower) and torque to drive the expected load at desirable speeds and acceleration. The traction electric motor 116 may be any conventional electric motor capable of operating in a drive mode, as well as operating in a regenerative braking mode. In the drive mode, the traction electric motor 116 consumes electrical power to drive one or both wheels 104. Typically, a motorbike is a rear-wheel drive vehicle meaning that power is directed to the rear wheel 104b, or drive wheel. In the regenerative braking mode, the traction electric motor 116 operates as a generator, producing electric current in response to rotation of the drive wheel 104b and producing a braking effect to slow a vehicle.

The electrical energy storage device(s) 118 may take a variety of forms, for example batteries (e.g., an array of battery cells), super- or ultracapacitors (e.g., an array of ultracapacitor cells), or combinations thereof. For example, the electrical energy storage device(s) 118 may take the form of rechargeable batteries (i.e., secondary cells or batteries). The electrical energy storage device(s) 118 may, for instance, be sized to physically fit, and electrically power, personal transportation electric vehicles 100, such as all-electric scooters or motorbikes, and may be portable to allow easy replacement or exchange. Given the likely demand imposed by the transportation application, electrical energy storage device(s) 118 are likely to take the form of one or more chemical battery cells. The electrical energy storage device(s) 118 may include a primary battery that supplies low-level current to low-power functional elements of the vehicle, for example, locks or security devices, clocks, lights, turn indicators 112, and the like. Furthermore, the electrical energy storage device(s) 118 may include a main battery for supplying power to the traction electric motor 116 under normal load conditions, and a boost battery for use when the load on the traction electric motor 116 is greater than normal.

Each of the electrical energy storage device(s) 118 may include number of electrical terminals 122a, 122b (two illustrated, collectively 122), accessible from an exterior of the electrical energy storage device(s) 118. The electrical terminals 122 allow charge to be delivered from the electrical energy storage device(s) 118, as well as allowing charge to be delivered to the electrical energy storage device(s) 118 for charging or recharging the same. While illustrated in FIG. 1 as posts, the electrical terminals 122 may take any other form which is accessible from an exterior of the electrical energy storage device(s) 118, including electrical terminals positioned within slots in a battery housing.

Figure 2:
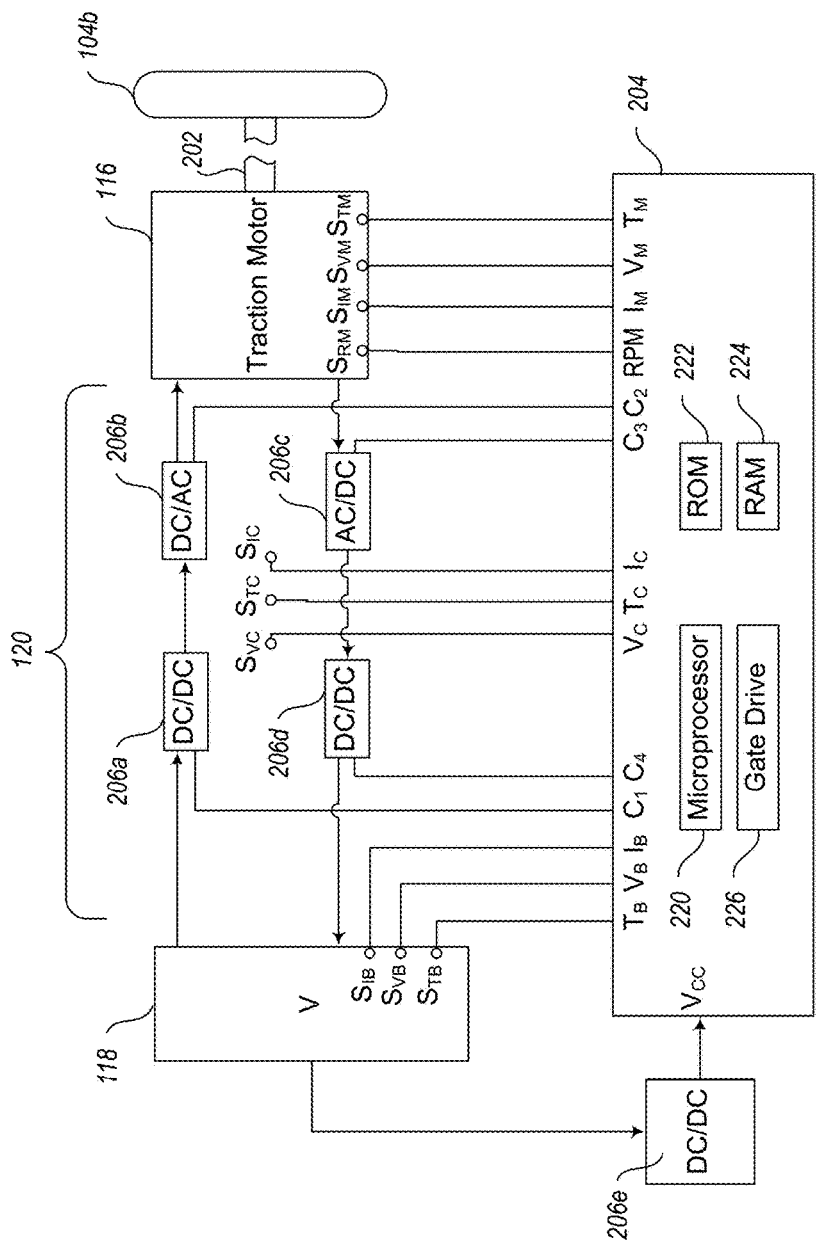
FIG. 2 is a block diagram of some of the components or structures of the vehicle of FIG. 1, according to one non-limiting illustrated embodiment.

FIG. 2 shows portions of the electric vehicle 100, according to one illustrated embodiment. In particular, FIG. 2 shows an embodiment which employs the electrical energy storage device(s) 118 to supply power to the traction electric motor 116 via the control circuit 120. As illustrated in FIG. 2, the traction electric motor 116 includes a shaft 202, which is coupled either directly or indirectly to drive at least one wheel (e.g., the rear wheel 104b) of the electric vehicle 100. While not illustrated, a transmission (e.g., chain, gears, universal joint) may be employed.

As better illustrated and described below, the control circuit 120 includes various components for transforming, conditioning and controlling the transfer of electrical power, particularly between the electrical energy storage device(s) 118 and the traction electric motor 116. The control circuit 120 may take any of a large variety of forms, and will typically include a controller 204, one or more power converters 206a-206e (five illustrated, collectively 206), and/or sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$. As illustrated in FIG. 2, the control circuit 120 may include a first DC/DC power converter 206a that, in a drive mode or configuration, couples the electrical energy storage device(s) 118 to supply power to the traction electric motor 116. The first DC/DC power converter 206a may step up a voltage of electrical power from the electrical energy storage device(s) 118 to a level sufficient to drive the traction electric motor 116. The first DC/DC power converter 206a may take a variety of forms, for example an unregulated or regulated switch mode power converter, which may or may not be isolated. For instance, the first DC/DC power converter 206a may take the form of a regulated boost switch mode power converter or buck-boost switch mode power converter.

The control circuit 120 may include a DC/AC power converter 206b, commonly referred to as an inverter, that, in the drive mode or configuration, couples the electrical energy storage device(s) 118 to supply power to the traction electric motor 116 via the first DC/DC converter 206a. The DC/AC power converter 206b may invert electrical power from the first DC/DC converter 206a into an AC waveform suitable to drive the traction electric motor 116. The AC wave form may be single phase or multi-phase, for example two or three phase AC power. The DC/AC power converter 206b may take a variety of forms, for example an unregulated or a regulated switch mode power converter, which may or may not be isolated. For instance, the DC/AC power converter 206b may take the form of a regulated inverter.

The first DC/DC power converter 206a and the DC/AC power converter 206b can be controlled via control signals $C_1$, $C_2$, respectively, supplied via the controller 204. For example, the controller 204, or some intermediary gate drive circuitry, may supply pulse width modulated gate drive signals to control operation of switches (e.g., metal oxide semiconductor field effect transistors (MOSFETs), or insulated gate bipolar transistors (IGBTs)) of the first DC/DC and/or DC/AC power converters 206a, 206b.

As further illustrated in FIG. 2, the control circuit 120 may include an AC/DC power converter 206c, commonly referred to as a rectifier, that, in a braking or regenerative braking mode or configuration, couples the traction electric motor 116 to supply power generated thereby to the electrical energy storage device(s) 118. The AC/DC power converter 206c may rectify an AC waveform from produced by the traction electric motor 116 to a DC form suitable for supplying the electrical energy storage device(s) 118 and, optionally, other components such as the control circuit 120. The AC/DC power converter 206c may take a variety of forms, for example a full bridge passive diode rectifier or full bridge active transistor rectifier.

The control circuit 120 may also include a second DC/DC power converter 206d that electrically couples the traction electric motor 116 to the electrical energy storage device(s) 118 via the AC/DC power converter 206c. The second DC/DC power converter 206d may step down a voltage or further filter the waveform of the rectified AC electrical power generated by the traction electric motor 116 to a level suitable for the electrical energy storage device(s) 118. The second DC/DC power converter 206d may take a variety of forms, for example an unregulated or a regulated switch mode power converter, which may or may not be isolated. For instance, the second DC/DC power converter 206d may take the form of a regulated buck switch mode power converter, synchronous buck switch mode power converter, or buck-boost switch mode power converter.

The AC/DC power converter 206c and the second DC/DC power converter 206d are controlled via control signals $C_3$, $C_4$, respectively, and supplied via the controller 204. For example, the controller 204, or some intermediary gate drive controller, may supply pulse width modulated gate drive signals to control operation of switches (e.g., MOSFETs, IGBTs) of the AC/DC and/or the second DC/DC power converters 206c, 206d.

As further illustrated in FIG. 2, the control circuit 120 may include a third DC/DC power converter 206e that electrically couples the electrical energy storage device(s) 118 to various other components, for example the controller 204. The third DC/DC power converter 206e may step down a voltage of the electrical power supplied by the electrical energy storage device(s) 118 to a level suitable for one or more other components. The third DC/DC power converter 206e may take a variety of forms, for example an unregulated or regulated switch mode power converter, which may or may not be isolated. For instance, the third DC/DC power converter 206e may take the form of a regulated buck switch mode power converter, synchronous buck switch mode power converter, or buck-boost switch mode power converter.

The one or more of the DC/DC converters 206a, 206d, and 206e can include one or more buck converters, boost converters, buck-boost converters, or any combination thereof. In some situations, one or more of the DC convert- ers 206a, 206d, and 206e may include a buck converter. A buck converter can include any switched device suitable for reducing an input DC voltage a lower output DC voltage. Typical buck converters include a switching device, for example a pulse wave modulated MOSFET or IGBT that controls the input voltage delivered to an inductor coupled in series and a diode and a capacitor coupled in parallel with the load. In some instances, the DC/DC buck converter may include a synchronous buck converter using one or more switching devices in lieu of the diode found in a conventional buck converter. The use of one or more switching devices such as a second MOSFET or IGBT transistor or transistor array in a synchronous buck converter may advantageously reduce power loss attributable to the diode forward voltage drop that occurs within a standard buck converter. In some situations, at least a portion of the one or more DC converters 206a, 206d, and 206e may include a boost converter. A boost converter can include any device or system suitable for increasing a relatively low input DC voltage to a higher DC output voltage. Such converters may be useful, for example in reducing the number of cells in the main battery needed to power the traction motor. For example, a DC boost converter may be used to provide 48V DC power to a traction motor in an electric scooter using 12V DC or 24V DC batteries as a power source. Typical boost converters include a switching device, for example a pulse wave modulated MOSFET or IGBT that alternatively permits the an electric field to build about an inductor in series with the source, then places the inductor and the source in series with a load to deliver power to the load at a voltage greater than the source voltage.

In some situations, at least a portion of the one or more DC converters 206a, 206d, and 206e may include a buck-boost converter. A buck-boost converter can include any number of systems or devices suitable for either increasing or decreasing an input voltage to provide either a higher or lower output voltage to one or more loads. Buck-boost converters may be useful, for example in adjusting the voltage output to the ultracapacitor provided during regenerative braking events when the input voltage provided to the buck-boost converter may vary with external factors such as braking force and speed. Buck-boost converters can include a switching device, for example a pulse wave modulated MOSFET or IGBT that alternatively permits an electric field to build about an inductor in series with the source and a capacitor in series with the load, then places the inductor and the capacitor in series with the load to deliver a power at a voltage that can be greater or less than the source voltage, dependent upon the demand placed on the converter by the load.

The one or more of the AC/DC converters 206b, 206c can include one or more active rectifiers, one or more passive rectifiers, or any combination thereof. In some situations, at least a portion of the one or more AC/DC converters 206b, 206c may include a passive rectifier, for example a full-wave bridge or Schottky rectifier comprising a plurality of passive devices such as diodes. Such passive rectifiers can include half-wave or full-wave rectifiers. Passive rectifiers are useful in converting at least a portion of the direct current supplied by the electrical energy storage device(s) 118 to the traction electric motor 116 (e.g., DC/AC converter 206b). Passive rectifiers are also useful in converting at least a portion of the alternating current generated by the traction electric motor 116 during regenerative braking events to direct current for supply to the electrical energy storage device(s) 118, the ultracapacitor, or to the AC/DC converter 206c.

In some situations, at least a portion of the one or more AC/DC converters 206b, 206c may include an active or synchronous rectifier comprising a plurality of active switching devices such as MOSFETs or the like that are used in lieu of the diode array found in a passive rectifier. Such active rectifiers can include half-wave or full-wave rectifiers, and advantageously reduce the power loss encountered in passive rectifiers due to the voltage attributable to the diodes used in passive rectifiers. Active rectifiers are useful in converting at least a portion of the direct current supplied by the electrical energy storage device(s) 118 to the traction electric motor 116 (e.g., DC/AC converter 206b). Active rectifiers are also useful in converting at least a portion of the alternating current generated by the traction electric motor 116 during regenerative braking events to direct current for supply to the electrical energy storage device(s) 118, the ultracapacitor, or the AC/DC converter 206c.

The controller 204 may take a variety of forms which may include one or more integrated circuits, integrated circuit components, analog circuits or analog circuit components. As illustrated, the controller 204 includes a microcontroller 220, non-transitory computer-or processor-readable memory such as a read only memory (ROM) 222 and/or random access memory (RAM) 224, and may optionally include one or more gate drive circuits 226.

The microcontroller 220 executes logic to control operation of the power system, and may take a variety of forms. For example, the microcontroller 220 may take the form of a microprocessor, programmed logic controller (PLC), programmable gate array (PGA) such as a field programmable gate array (FPGS), and application specific integrated circuit (ASIC), or other such microcontroller device. The ROM 222 may take any variety of forms capable of storing processor executable instructions and/or data to implement the control logic. The RAM 224 may take any variety of forms capable of temporarily retaining processor executable instructions or data. The microcontroller 220, ROM 222, RAM 224 and optional gate drive circuit(s) 226 may be coupled by one or more buses (not shown), including power buses, instructions buses, data buses, address buses, etc. Alternatively, the control logic may be implemented in an analog circuit.

The gate drive circuit(s) 226 may take any of a variety of forms suitable for driving switches (e.g., MOSFETs, IGBTs) of the power converters 206 via drive signals (e.g., PWM gate drive signals). While illustrated as part of the controller 204, one or more gate drive circuits may be intermediate the controller 204 and the power converters 206.

The controller 204 may receive signals from one or more sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$.

A battery temperature sensor $S_{TB}$ may be positioned to sense a temperature of the main electrical power storage device(s) 118, or the ambient environment proximate the main electrical power storage device(s) 118, and provide signals $T_B$ indicative of the sensed temperature.

A battery voltage sensor $S_{VB}$ may be positioned to sense a voltage across the main electrical power storage device(s) 118 and provide signals $V_B$ indicative of the sensed voltage.

A battery charge sensor $S_{IB}$ may be positioned to sense a charge of the main electrical power storage device(s) 118 and provide signals $I_B$ indicative of the sensed charge.

A power converter temperature sensor $S_{TC}$ may be positioned to sense a temperature of one or more of the power converters 206, or the ambient environment proximate the power converter(s) 206, and provide signals $T_C$ indicative of the sensed temperature.

A power converter voltage sensor $S_{VC}$ may be positioned to sense a voltage across one or more of the power converters 206 and provide signals $V_C$ indicative of the sensed voltage.

A power converter charge sensor $S_{IC}$ may be positioned to sense a charge through one or more of the power converters 206 and provide signals $I_C$ indicative of the sensed charge.

A traction motor temperature sensor $S_{TM}$ may be positioned to sense a temperature of the traction electric motor 116, or the ambient environment proximate the traction electric motor 116, and provide signals $T_M$ indicative of the sensed temperature.

A traction motor voltage sensor $S_{VM}$ may be positioned to sense a voltage across the main electrical power storage device(s) 118 and provide signals $V_M$ indicative of the sensed voltage.

A traction motor current sensor $S_{IM}$ may be positioned to sense a current flow through the traction electric motor 116 and provide signals $I_M$ indicative of the sensed current.

A traction motor rotational sensor $S_{RM}$ may be positioned to sense a current flow through the traction electric motor 116 and provide signals RPM indicative of the sensed rotational speed. Many of the structures and/or components are similar, or even identical, to those illustrated and described with reference to FIGS. 1 and 2, above. Such structures and components will share the same reference numbers as used in FIG. 1 and FIG. 2, and will not be described in further detail. Only some of the significant differences are described immediately below.

Figure 3:
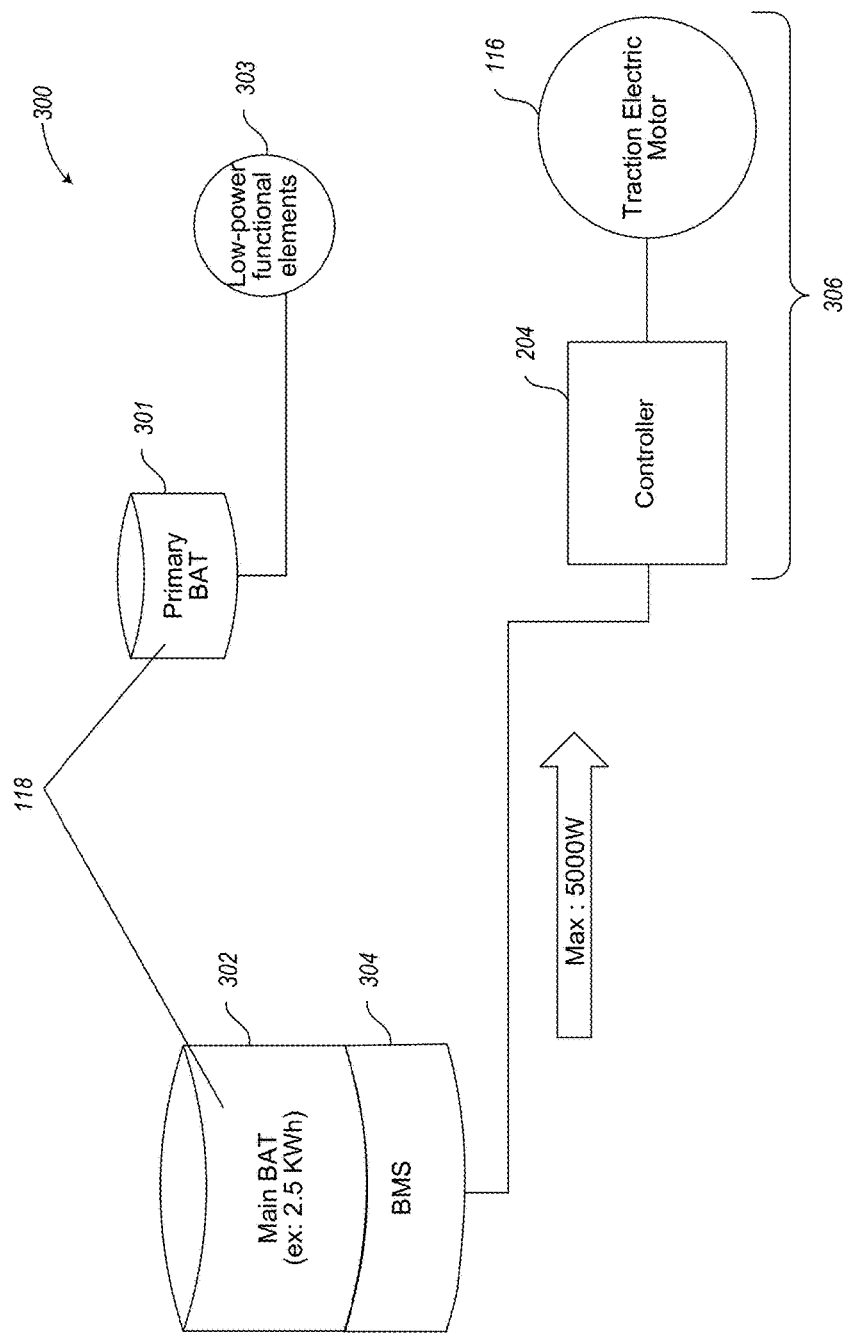
FIG. 3 is a block diagram of a prior art power delivery circuit for a standard performance scooter.

FIG. 3 shows portions of a conventional power delivery system 300 within the electric vehicle 100. In particular, FIG. 3 shows an embodiment in which the electrical energy storage device(s) 118 include a primary battery 301 and a main battery 302, supported by a battery management system (BMS) 304.

The primary battery 301 supplies low-level current to low-power functional elements 303 of the electric vehicle 100 such as locks or security devices, clocks, lights, turn indicators 112, and the like. According to an exemplary embodiment, the main battery 302 supplies power to a drive train load 306 that includes at least the controller 204 and the traction electric motor 116. The traction electric motor 116 is used to drive rotation of the axle 202 so as to transfer power to, for example, the rear wheel 104b. The main battery 302 is intended to be removable for external recharging.

The main battery 302 can be configured as a high-capacity power source of intermediate-level current, which can be a high energy density (Watt-hours/kilogram) Lithium-ion cell such as, for example, a Li-NCM (Lithium-Nickel Cobalt Manganese) type battery, a Li—CO (Lithium-Cobalt), or a Li—Mn204 (Lithium-Manganese) type battery, or the like. The main battery 302 can also include one or more capacitors. Under a normal load, the main battery 302 can be capable of, for example, a 2 C discharge rate, which means that if the capacity of the battery is 2.5 kilowatt-hours (kWh), the main battery 302 can supply a maximum of 5000 Watts (5 kW) to the electric vehicle 100. Li-NCM batteries typically provide a long driving range, but the batteries have a short life cycle, which limits the number of charging cycles to about 500.

The main BMS 304 is used for battery monitoring and, in particular, for monitoring the battery during charging and discharging to ensure that voltages, currents, and temperatures remain within normal limits. For example, when the main battery 302 is discharged to 0%, the main BMS 304 can disconnect the main battery 302 from the load. Similarly, when the main battery 302 is removed for external charging, both the main battery 302 and the main BMS 304 can be removed as one unit, so that, for example, the BMS can ensure that the charging current received by the main battery 302 does not exceed certain safety limits. Use of the BMS can protect the main battery 302 from damage and prolong the battery life. Other functions of the main BMS 304 may include, for example, providing alerts when battery maintenance is needed, monitoring and logging historical data over the lifetime of the battery for subsequent troubleshooting, or communicating with an external charger or test equipment.

Figure 4:
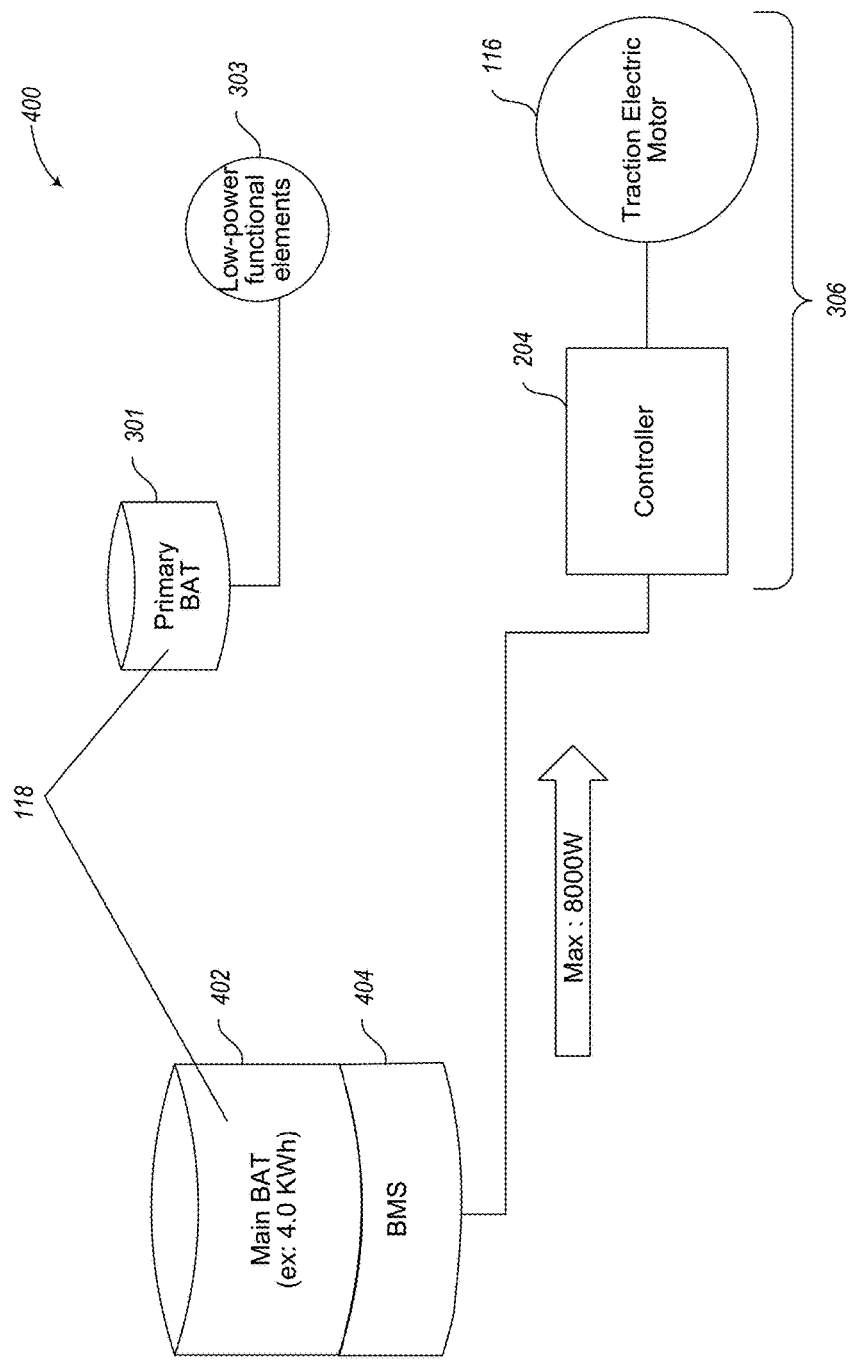
FIG. 4 is a block diagram of a prior art power delivery circuit for a high-performance scooter.

To supply power to an electric vehicle 100 in a high-performance drive mode, a conventional high-performance power delivery system 400 can be employed, as shown in FIG. 4. The conventional high-performance power delivery system 400 includes, as electrical power storage device(s) 118, the primary battery 301 for powering the low-power functional elements 303, and, in place of the main battery 302, a higher capacity main battery 402 and associated higher capacity BMS 404. The higher capacity main battery 402 can be, for example, a 4 kWh battery capable of supplying 8 kW of power to the drive train load 306. However, the higher capacity main battery 402 is typically a heavy-weight battery, and therefore it may not be practical for small vehicles such as scooters or motorbikes. In addition, the higher capacity main battery 402 can raise the price of a scooter or motorbike beyond what is considered a normally-affordable range. Furthermore, the high-performance advantage of a higher capacity main battery 402 may only be fully utilized intermittently in actual operation of a small vehicle.

Figure 5:
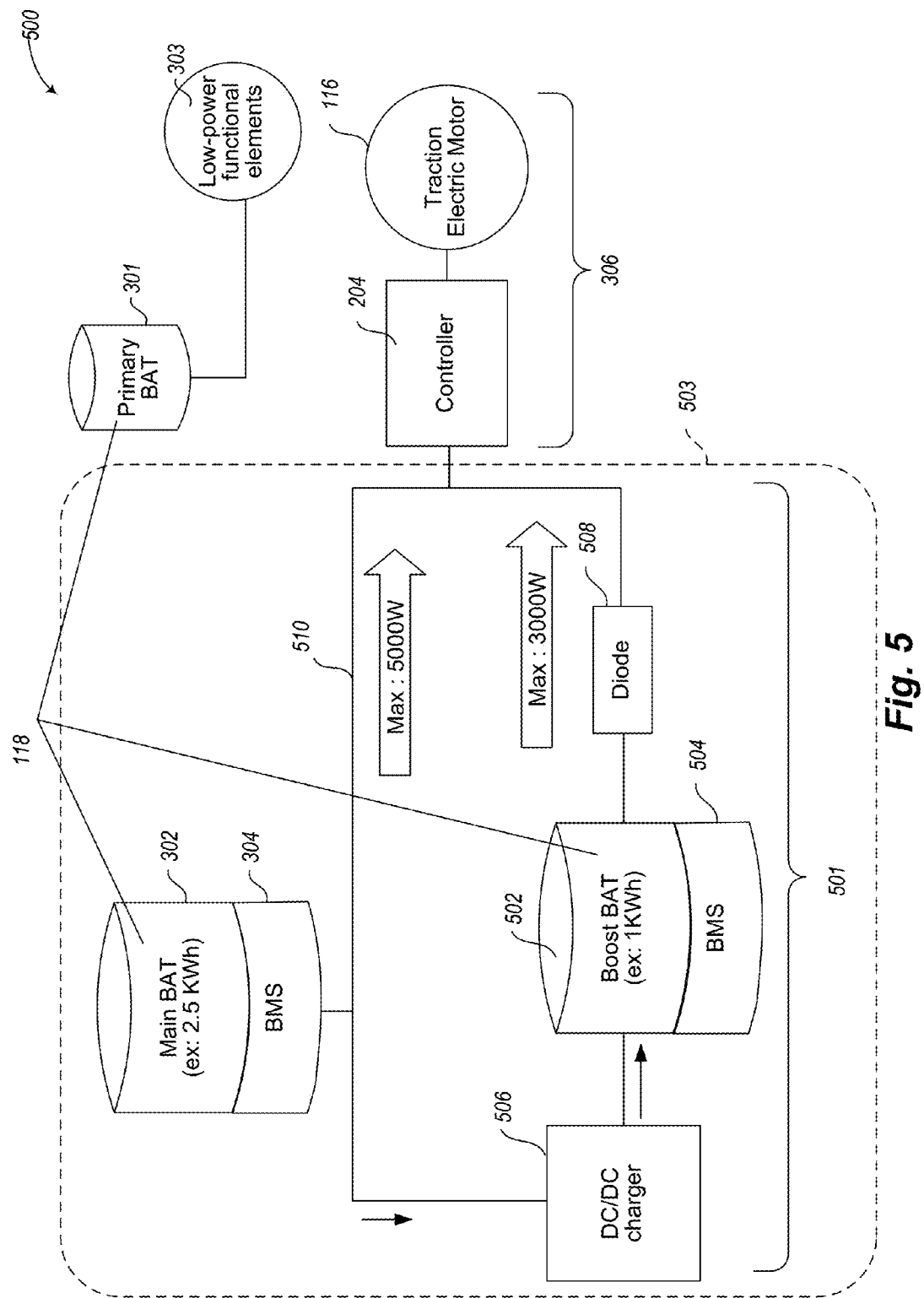
FIG. 5 is a block diagram of a power delivery and charging circuit for a high-performance scooter that includes a boost battery, according to one non-limiting illustrated embodiment.

FIG. 5 shows an exemplary electrical power delivery system 500 for use with the electric vehicle 100. The electrical power delivery system 500 includes a boost stage 501 that offers an efficient, low weight, and cost-effective power-management solution to provide a high-performance drive mode for a smaller electric vehicle 100 such as a scooter or motorbike. For example, the boost stage 501 can be provided as a high-performance sport model option package for an all-electric personal transport vehicle. However, use of the boost stage 501 is not limited to small electric vehicles as described herein.

Within the electrical power delivery system 500, the electrical energy storage device(s) 118 include the primary battery 301 that supplies a low current to low-power functional elements 303 of the electric vehicle 100, a main battery 302, and an auxiliary boost battery 502. The main battery 302 and the boost battery 502 cooperate to power the drive train load 306. The boost stage 501, together with the main battery 302 and the main BMS 304, are elements of a charging circuit 503 which allows the electric vehicle 100 to receive more power (e.g., at a discharge rate of 4-5 C) in a high-performance mode when needed, while charging the boost battery when it is not needed, either when the electric vehicle 100 is at rest, or while the drive train load is within a normal mode, as opposed to the high-performance mode. Thus, high-performance criteria such as faster speed and acceleration can still be met, while the main battery and the boost battery together weigh less and cost less than batteries such as the high-capacity battery 402.

With reference to FIG. 5, the boost stage 501 can include boost stage components such as the boost battery 502, a boost BMS 504, a DC/DC charger 506, and a boost switch 508 to assist in supplying power to the drive train load 306. The boost battery 502 is intended to be charged on-board the vehicle 100, but it can also be removable for external charging. The boost battery 502 can be configured to supply, upon request, a high-level current at a higher discharge rate than that of the main battery 302.

The boost battery 502 is preferably a high power density Lithium-ferrite cell with 1 kWh capacity or a similar cell that is properly matched to the capacity of the main battery 302 so as to provide the necessary energy to the drive train load 306. For example, the boost battery 502 can have ⅓ or less of the capacity of the main battery 302. Lithium-ferrite cells or other high power density cells are designed to supply high output power and to charge quickly. One advantage provided by such high power density cells is that they have a longer lifetime, e.g., up to about 2000 charging cycles. High power density cells are also generally smaller and lighter weight than Lithium-ion cells. However, because they charge and discharge faster, the driving range provided by a Lithium-ferrite cell tends to be limited. The boost battery 502 is not limited to a particular type of cell, and therefore it can be a Lithium-ion cell similar to the main battery 302, or the boost battery 502 can be of a different type altogether.

One advantage of the electrical power delivery system 500 is that different chemistries can be used for the main battery 302 and the boost battery 502, without a need for an additional charge balancing circuit if the capacities are sized correctly. Due to the configuration of the charging circuit 503, the electrical power delivery system 500 is effectively a self-balancing system in which the charging and discharging rates of the batteries can be monitored and adjusted. For example, if the main battery 302 has a chemistry that is characterized by a lower discharge rate than that of the boost battery 502, as described above, then, in the instance where electric power is supplied from the boost battery 502, the charge imbalance between the main battery 302 and the boost battery 502 may increase. The DC/DC charger 506 will then automatically, or on demand, transfer charge to the boost battery 502 to reduce the charge imbalance. Likewise, the diode 508 can turn on and charge up the main battery 302 to reduce the charge imbalance. The DC/DC charger 506 and the diode 508 can be chosen and/or configured to activate (e.g., by selecting the device based on its threshold voltage or by setting a threshold voltage) when a certain degree of charge imbalance occurs between the two batteries. It is desirable to limit the charge imbalance to ensure that neither battery is fully depleted when the system is called upon to service any one of various load conditions. In other systems that do not include such a charging circuit, either the choice of battery chemistries is limited, or a balance circuit must be included to balance the charge generated by the different chemistries.

The boost BMS 504 performs functions for managing and protecting the boost battery 502, similar to the functions that the main BMS 304 provides for the main battery 302.

The boost stage 501 within the power delivery system 500 is generally electrically coupled in parallel to the main battery 302 by a connection 510 so that the main battery 302 can deliver 5 kW of power and the remaining 3 kW can be supplied by the boost battery 502. The main battery 302 can be used to power the drive train load 306, or to charge the boost battery 502, or both. The main battery 302 can charge the boost battery 502 through the DC/DC charger 506 either while the electric vehicle 100 is in operation or while the vehicle is not operating. Furthermore, the charging can be continuous or intermittent, based on, for example, a timing scheme, or on demand according to the load. The DC/DC charger 506 can limit the direction of a charging current so that the charging current flows only from the main battery 302 to the boost battery 502. The boost switch 508 can be used to isolate the boost battery 502 from the drive train load 306, for example, when the boost battery 502 is not needed, or if the boost battery 502 is being charged. The boost switch 508 can be a directional switch such as a diode switch that permits current to flow in a preferred direction. Alternatively, or in addition to a diode, the boost switch 508 can include a MOSFET (metal-oxide-semiconductor field effect transistor) device. With the addition of the boost stage 501, the main battery 302 can be disconnected from the electrical system within the electric vehicle for external recharging, and, if necessary, the vehicle 100 can continue to operate with power supplied by only the boost battery. When the main battery 302 is disconnected, the boost battery 502 supplies power to the traction electric motor 116 if the boost switch 508 is closed. While the main battery 302 is supplying power to the drive train load 306, the boost switch 508 can engage the boost battery 502 to assist the main battery 302 in powering the drive train load 306 in response to an increase in load resistance that can be sensed automatically, for example, if the electric vehicle 100 is being driven at a speed that exceeds a certain threshold speed.

Figure 6:
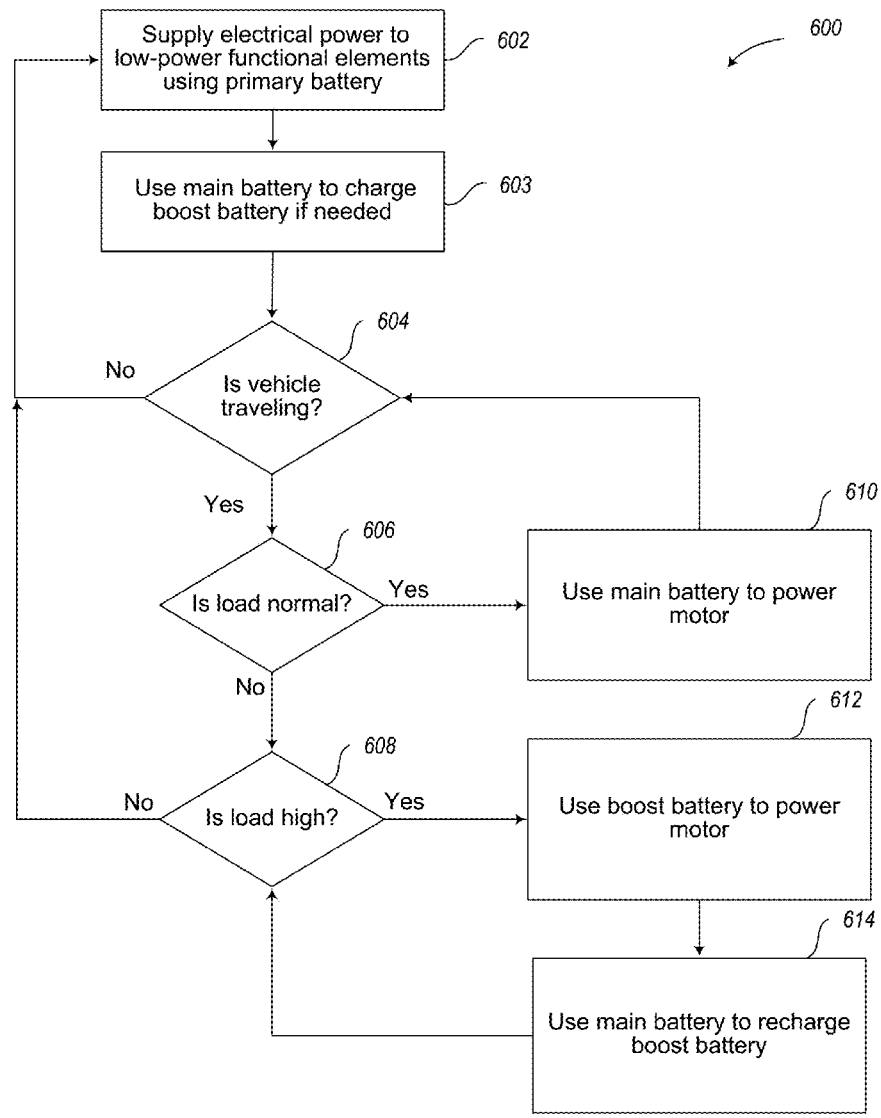
FIG. 6 is a flow diagram showing a method of operating the components or structures of FIGS. 2 and 5 to implement efficient power delivery depending on the load, according to one non-limiting illustrated embodiment.
Figure 7:
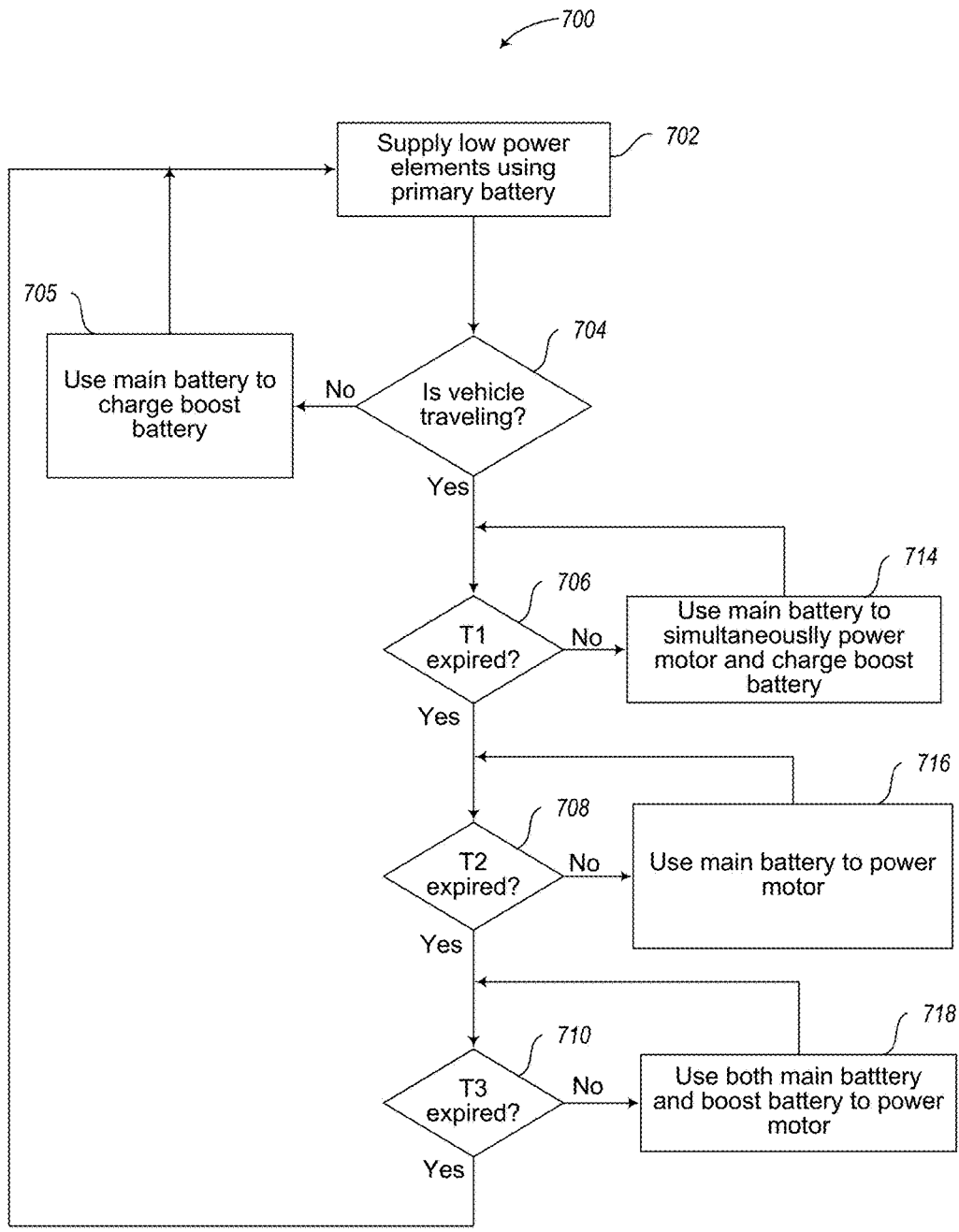
FIG. 7 is a flow diagram showing a method of operating the components or structures of FIGS. 2 and 5 to implement efficient power delivery depending on time intervals, according to another non-limiting illustrated embodiment.

FIGS. 6 and 7 illustrate possible methods of managing power requirements associated with a drive train load 306 that can be intermittently in a high-performance drive mode, using the charging circuit 503 shown in FIG. 5. For example, a load-specific power management method 600 reserves the boost battery for high-performance situations. At 602, a primary battery supplies a low-level electric current to low-power functional elements while, at 603, the main battery 302 can be used to charge the boost battery 502 if needed. At 604, a determination is made as to whether or not the electric vehicle 100 is traveling. If the vehicle is at rest, the primary battery continues to supply power, and the main battery 302 and the boost battery 502 can both remain off, if the boost battery is fully charged. If the electric vehicle 100 is traveling, it is determined at 606 whether or not the vehicle is in a normal-load state or a high-performance drive mode, according to a predetermined power threshold, for example, if the load does not exceed 5 kWh. If this threshold is not exceeded, the main battery 302 is used at 610 to supply power to the traction electric motor 116. This power scheme continues until it is determined at 606 that the traction electric motor 116 no longer has a normal load requirement. At 608 it is then determined whether the electric vehicle 100 is in a high-performance drive mode, or whether the power requirement has dropped below the normal range, indicating, for example, that the vehicle is slowing down or approaching a stop. If the power requirement is less than normal, the method 600 repeats starting at 602. If the power demanded by the drive train load 306 is determined to be high at 608, the boost battery 502 is then used to power the motor at 612, while the main battery 302 is used to recharge the boost battery 502 at 614. This power scheme continues until it is determined at 608 that the load is no longer high, and the method 600 repeats starting at 602. The determinations 604, 606, and 608 are preferably made automatically by the microcontroller 220 which can be programmed to compare various sensor output levels against threshold values. For example, the determinations 604, 606, and 608 can be based on the output of the sensors $S_{RM}$, $S_{IM}$, $S_{VM}$, or $S_{TM}$ that indicate the state of the traction electric motor 116. However, embodiments consistent with the method 600 can include a user-controlled switch that can be used to intermittently engage the boost battery 502.

FIG. 7 illustrates a timer-implemented power management method 700 that uses a set of timers to measure, for example, three time intervals T1, T2, and T3. The time intervals can be used by the microcontroller 220 to automatically control power supplied to the traction electric motor 116. At 702, the low-power functional elements 303 within the electric vehicle 100 are supplied with a low current by the primary battery 301. At 704, it is determined whether or not the electric vehicle 100 is traveling. If the electric vehicle 100 is idle, the main battery 302 charges the boost battery 502 at 705 until either the boost battery is fully charged or the electric vehicle 100 begins traveling at 704. Once the electric vehicle 100 is traveling, a timer T1 is set to expire after a certain first time interval. During the first time interval, the main battery 302 powers the traction electric motor 116 at 714, and also charges the boost battery 502. When it is determined at 706 that the timer T1 has expired, a timer T2 is set to expire after a certain second time interval at 708. During the second time interval, at 716, the main battery 302 stops charging the boost battery 502 and only powers the traction electric motor 116. When it is determined at 708 that the timer T2 has expired, a timer T3 is set to expire after a certain third time interval at 710. During the third time interval, both the boost battery 502 and the main battery 302 contribute to powering the traction electric motor 116 at 718. Thus, during the third time interval, both the boost battery 502 and the main battery 302 are switched on, and both batteries discharge simultaneously to power the motor 116. When it is determined at 710 that the timer T3 has expired, the method 700 repeats at 702.

Alternatively, instead of using either the load-specific power management method 600, or the timer-implemented power management method 700, the vehicle 100 can be powered using other power management methods. For example, it may be desirable for the boost battery 502 to be used to power the drive train load 306 whenever the vehicle 100 is not at rest, and for the main battery 302 to be used only for charging the boost battery 502. This method can offer both a superior range and performance, if peak efficiency is not of primary importance.

Figure 8:
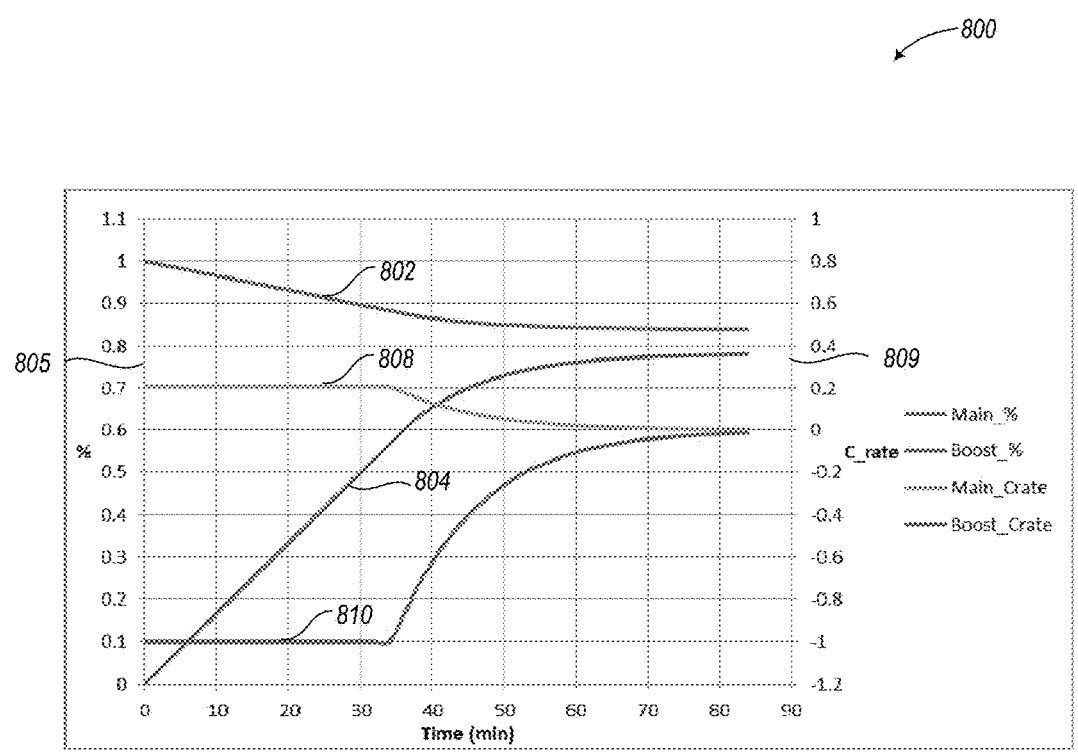
FIG. 8 is a plot describing a boost battery charging scenario during use of the disclosed power delivery system for a vehicle at rest.
Figure 9:
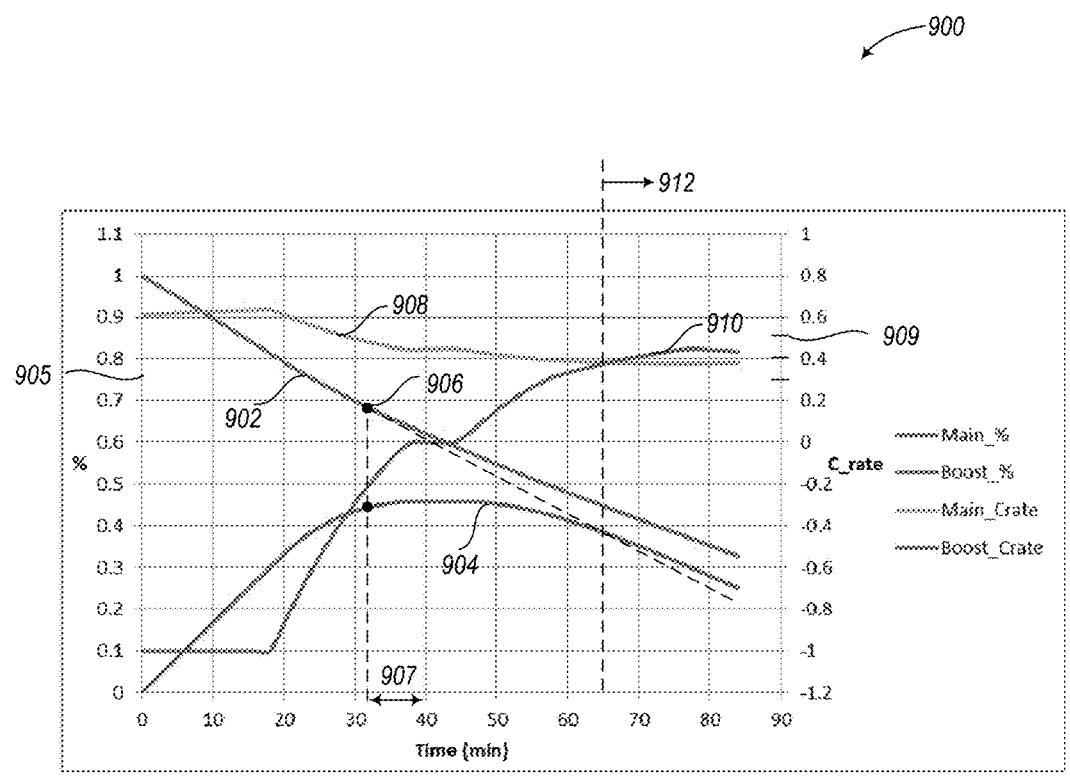
FIG. 9 is a plot describing a boost battery charging scenario during use of the disclosed power delivery system for a traveling vehicle.

FIGS. 8 and 9 illustrate the relative amounts of power supplied by the various power sources within the power delivery system 500, in each of two exemplary embodiments. FIG. 8 illustrates a charging-at-rest scenario in which a user installs a fully charged main battery 302 in the electric vehicle 100, after which the electric vehicle 100 remains at rest. FIG. 8 shows a charging circuit plot 800 of the main battery charge percentage 802 and the boost battery charge percentage 804 as a function of time after installation, using the left y-axis scale 805. The main battery charge percentage 802 decreases from 100% to a final value of about 84% over about an 80-minute time period, while the boost battery charge percentage rises from 0% to a final value of about 78% over the same 80-minute time period. The curves 808 and 810 show the main battery discharge rate and the boost battery charging rate (expressed as a negative discharging rate), respectively, using the right y-axis scale 809. For the first 35 minutes of discharging, the main battery discharge rate 808 is maintained at about 20%. After the 35-minute mark, the main battery discharge rate 808 gradually drops to zero as the boost battery 502 becomes fully charged, about 80 minutes after installation. Meanwhile, the boost battery charging rate 810 is charging at 100% for the first 35 minutes, decreasing gradually to zero after the full 80-minute charging time.

FIG. 9 illustrates an exemplary charging-during-operation scenario, consistent with the timer-implemented power management method 700, in which a user installs a fully charged main battery 302 in the electric vehicle 100 and operates the electric vehicle 100 at a speed of about 50 kilometers per hour (kph). During this scenario, the main battery 302 initially supplies power to operate the traction electric motor 116 while at the same time charging the boost battery 502. FIG. 9 shows a charging circuit plot 900 of the main battery charge percentage 902 and the boost battery charge percentage 904 as a function of time after installation, using a left y-axis scale 905. For about the first 33 minutes (T1), the main battery 302 powers the drive train load 306 and also charges the boost battery 502. During this period, the main battery charge percentage 902 decreases rapidly from 100% to a value of about 65%. At about 33 minutes, there is an inflection point 906 in the curve of the main battery charge percentage 902, at which the slope of the curve shifts, indicating a slower rate of decrease. At this time, the main battery 302 stops charging the boost battery 502 and powers only the drive train load 306 during a crossover time interval 907 from about 33-40 minutes (T2) following installation. By the end of the crossover time interval 907, the main battery charge percentage is at a value of about 62%. Meanwhile, the boost battery charge percentage 904 rises from 0% to a maximum value of about 45% during the first 33 minutes of charging. During the crossover time interval 906, the boost battery charge percentage 904 levels off as the boost battery switches from the role of a passive load to being an active source in the charging circuit 503. After about 40 minutes (T3), both the main battery 302 and the boost battery 502 contribute to powering the drive train load 306. Thereafter, both the main battery charge percentage 902 and the boost battery charge percentage 904 decrease together at about the same rate (as indicated by the parallel slopes of the charge percentages 902 and 904), until, after about 85 minutes, the main battery charge percentage 902 has reached a final steady-state value of about 32% and the boost battery charge percentage 904 is at a final steady-state value of about 25%.

The curves 908 and 910 show the main battery discharge rate and the boost battery charging rate (expressed as a negative discharging rate), respectively, using the right y-axis scale 909. For about the first 20 minutes of discharging, the main battery discharge rate 908 is maintained within the range of about 60-62%. After the 20-minute mark, the main battery discharge rate 908 gradually drops to a steady state value of about 38% as the main battery continues to charge the boost battery 502 for the first 40 minutes. Meanwhile, the boost battery charging rate 910 is maintained at about 100% for about the first 18 minutes, decreasing gradually to zero at about the 40-minute mark. At the end of the crossover time interval 907, the boost battery 502 begins contributing to powering the drive train load 306, and therefore the boost battery 502 stops charging. At this time, the main battery discharge rate 908 remains at an approximately constant value of about 38% as it continues to discharge as it powers the drive train load 306. After the 40-minute mark, the boost battery discharging rate 910 gradually rises from zero to a steady state value of about 45%, (slightly higher than the 38% steady state value of the main battery discharging rate) as the boost battery 502 also contributes to powering the load from the 40-minute mark to the 85-minute mark. Thus, in a steady-state time interval 912 within the range of about 65-85 minutes after installation, the main battery 302 and the boost battery 502 share about equally in powering the drive drain load 306.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a power system for a vehicle having an electric motor coupled to drive at least one wheel of the vehicle, the method comprising:
   supplying electrical power to low-power functional elements of the vehicle using a primary battery;
   supplying electrical power to the electric motor using a high-capacity main battery in response to sensing a first load on the electric motor; and
   supplying electrical power to the electric motor using a high-performance boost battery in response to sensing a second load on the electric motor; and
   recharging the high-performance boost battery from the high-capacity main battery during operation of the electric motor, the recharging of the high-performance boost battery occurring based on detection of a load resistance of the electric motor.

2. The method of claim 1, wherein the second load on the electric motor is greater than the first load on the electric motor.

3. The method of claim 1, further comprising:
   removing the high-capacity main battery for external charging.

4. The method of claim 1 wherein:
   supplying electrical power to the electric motor using a high-capacity main battery in response to sensing a first load on the electric motor includes providing the high-capacity main battery which includes a first chemistry; and
   supplying electrical power to the electric motor using a high-performance boost battery in response to sensing a second load on the electric motor includes providing the high-performance boost battery which includes a second chemistry, the first and the second chemistries being different.

5. The method of claim 1, further comprising:
   electrically coupling in parallel the high-capacity main battery and the high-performance boost battery.

6. The method of claim 1, further comprising:
   monitoring at least one of a charging rate or a discharging rate of the high-capacity main battery.

7. The method of claim 6, further comprising:
monitoring at least one of a charging rate or a discharging rate of the high-performance boost battery.

8. The method of claim 7, further comprising:
determining a charge imbalance between the high-capacity main battery and the high-performance boost battery based on:
the monitoring of at least one of the charging rate or the discharging rate of the high-capacity main battery; and
the monitoring of at least one of the charging rate or the discharging rate of the high-performance boost battery.

9. The method of claim 8, further comprising:
adjusting a charge supplied from the high-capacity main battery to the high-performance boost battery during recharging of the high-performance boost battery from the high-capacity main battery in response to a difference between the charge imbalance and a threshold value.

10. The method of claim 9 wherein the threshold value is a threshold voltage.

11. The method of claim 1, further comprising:
continuously recharging the high-performance boost battery from the high-capacity main battery during operation of the electric motor, the recharging of the high-performance boost battery occurring based on detection of the load resistance of the electric motor.

12. The method of claim 1, further comprising:
intermittently recharging the high-performance boost battery from the high-capacity main battery during operation of the electric motor, the recharging of the high-performance boost battery occurring based on detection of the load resistance of the electric motor.

13. A method of operating a power system for a vehicle having an electric motor, a primary battery, a high-capacity secondary main battery, and a high-performance tertiary boost battery, the method comprising:
supplying electrical power to low-power functional elements of the vehicle using the primary battery;
when the vehicle is not traveling, charging the boost battery, the charging based on a load resistance of the electric motor, which is configured to drive a wheel of the vehicle;
when the vehicle is traveling,
using the main battery to supply electrical power to the motor while charging the boost battery for a first time interval;
supplying electrical power to the motor for a second time interval; and
using both the main battery and the boost battery together to supply electrical power to the electric motor for a third time interval.

14. The method of claim 13 wherein the vehicle is a scooter.

15. The method of claim 13, further comprising:
electrically coupling in parallel the main battery and the boost battery.

16. The method of claim 13 wherein the boost battery and the main battery have different corresponding chemistries.

17. The method of claim 13 wherein the main battery includes one or more capacitors.

18. The method of claim 13 wherein a discharge rate of the boost battery exceeds that of the main battery.

19. The method of claim 13 wherein, after expiration of the third time interval, the method further comprises:
supplying electrical power to low-power functional elements of the vehicle using the primary battery;
when the vehicle is not traveling, charging the boost battery, the charging based on a load resistance of the motor, which is configured to drive a wheel of the vehicle;
when the vehicle is traveling,
using the main battery to supply electrical power to the motor while charging the boost battery for the first time interval;
supplying electrical power to the motor for the second time interval; and
using both the main battery and the boost battery together to supply electrical power to the motor for the third time interval.

20. The method of claim 13 wherein the boost battery is a lithium ferrite battery.

* * * * *